(12) United States Patent
Yang

(10) Patent No.: US 11,958,315 B2
(45) Date of Patent: Apr. 16, 2024

(54) MANUALLY ADJUSTABLE MOVABLE BASE FOR OUTDOOR UMBRELLA

(71) Applicant: LINHAI LIJU ARTWARE CO., LTD, Zhejiang (CN)

(72) Inventor: Hongwei Yang, Zhejiang (CN)

(73) Assignee: LINHAI LIJU ARTWARE CO., LTD, Zhejiang (CN)

( * ) Notice: Subject to any disclaimer, the term of this patent is extended or adjusted under 35 U.S.C. 154(b) by 93 days.

(21) Appl. No.: 17/782,667

(22) PCT Filed: Jan. 21, 2021

(86) PCT No.: PCT/CN2021/073047
§ 371 (c)(1),
(2) Date: Jun. 6, 2022

(87) PCT Pub. No.: WO2021/218245
PCT Pub. Date: Nov. 4, 2021

(65) Prior Publication Data
US 2023/0021080 A1    Jan. 19, 2023

(30) Foreign Application Priority Data
Apr. 30, 2020 (CN) .......................... 202020708059.7

(51) Int. Cl.
*A45B 25/00* (2006.01)
*B60B 3/06* (2006.01)
(Continued)

(52) U.S. Cl.
CPC .............. *B60B 33/06* (2013.01); *A45B 25/00* (2013.01); *F16M 11/42* (2013.01); *B60B 33/02* (2013.01); *F16M 11/04* (2013.01)

(58) Field of Classification Search
CPC ........ A45B 25/00; F16M 11/42; F16M 11/04; B60B 33/06; B60B 33/02; B63B 33/066
See application file for complete search history.

(56) References Cited

U.S. PATENT DOCUMENTS

| 10,017,955 B2* | 7/2018 | Ye .......................... A45B 23/00 |
| 2012/0024329 A1* | 2/2012 | Ma .......................... F16M 7/00 280/30 |

(Continued)

FOREIGN PATENT DOCUMENTS

| CN | 101078456 | 11/2007 |
| CN | 200999947 | 1/2008 |

(Continued)

OTHER PUBLICATIONS

"International Search Report (Form PCT/ISA/210) of PCT/CN2021/073047," dated Mar. 26, 2021, with English translation thereof, pp. 1-4.

(Continued)

*Primary Examiner* — Tan Le
(74) *Attorney, Agent, or Firm* — JCIPRNET

(57) ABSTRACT

A manually adjustable movable base for an outdoor umbrella includes a base assembly, a screw rod rotatably fitted at the center of the foundation base assembly, a cranking rod which is in transmission fit with the screw rod and is used for driving the screw rod to rotate, a plurality of pull rods rotatably fitted with the base assembly, and a plurality of bottom wheels which are arranged on the base assembly and are correspondingly fitted with the pull rods. The lower end of the screw rod is in threaded connection with a lifting block, and the lifting block is fitted with and connected to the pull rods.

9 Claims, 2 Drawing Sheets

(51) Int. Cl.
  *B60B 33/06*   (2006.01)
  *F16M 11/42*   (2006.01)
  *B60B 33/02*   (2006.01)
  *F16M 11/04*   (2006.01)

(56) References Cited

U.S. PATENT DOCUMENTS

2014/0190294 A1    7/2014  Ma
2021/0321768 A1*  10/2021  Hiorth .................. A47B 91/005

FOREIGN PATENT DOCUMENTS

CN      201047483        4/2008
CN      206699608       12/2017
CN      111407051        7/2020
EP         3446935 A3 *  3/2019  ......... B60B 33/0089

OTHER PUBLICATIONS

"Written Opinion of the International Searching Authority (Form PCT/ISA/237) of PCT/CN2021/073047," dated Mar. 26, 2021, pp. 1-5.

* cited by examiner

MANUALLY ADJUSTABLE MOVABLE BASE FOR OUTDOOR UMBRELLA

CROSS-REFERENCE TO RELATED APPLICATION

This application is a 371 of international application of PCT application serial no. PCT/CN2021/073047 filed on Jan. 21, 2021 which claims the priority benefit of China application no. 202020708059.7, filed on Apr. 30, 2020. The entirety of each of the above mentioned patent applications is hereby incorporated by reference herein and made a part of this specification.

TECHNICAL FIELD

The present invention belongs to the field of outdoor supplies, and in particular relates to a manually adjustable movable base for an outdoor umbrella.

DESCRIPTION OF RELATED ART

An outdoor umbrella is difficult to carry due to its large size and weight, so merchants usually add universal wheels at the bottom of the base of the outdoor umbrella. However, a new problem that the base is not stable enough and easy to slide due to the universal wheels is caused after adding the universal wheels.

SUMMARY

To make up for the deficiencies in the prior art, a technical solution of a manually adjustable movable base for an outdoor umbrella is provided.

The manually adjustable movable base for the outdoor umbrella includes a base assembly, a threaded rod rotatably fitted with the base assembly, a cranking rod in transmission fit with the threaded rod and used for driving the threaded rod to rotate, a plurality of pull rods rotatably fitted with the base assembly, and a plurality of bottom wheels arranged on the base assembly and in corresponding fit with the pull rods. A lower end of the threaded rod is in threaded connection with a lifting block, and the lifting block is fitted with and connected to the pull rods.

In accordance with the manually adjustable movable base for the outdoor umbrella, the base assembly includes a base outer frame, a plurality of bottom wheel enclosure frames respectively and fixedly connected to corners of the base outer frame, and a plurality of pull rod mounting frames respectively and fixedly connected to the bottom wheel enclosure frames. Inner ends of all of the pull rod mounting frames are in fixed fit to form a center portion for rotatably mounting the threaded rod, and outer ends of the pull rods are rotatably fitted with the pull rod mounting frames; and the bottom wheels are respectively located on the bottom wheel enclosure frames.

In accordance with the manually adjustable movable base for the outdoor umbrella, a number of the pull rods, the bottom wheels, the bottom wheel enclosure frames and the pull rod mounting frames each are four. The four bottom wheels are respectively located at four corners of the base assembly, and the four pull rods and the four pull rod mounting frames form X-shaped structures respectively.

In accordance with the manually adjustable movable base for the outdoor umbrella, a mounting base is fixed to and fitted with the center portion.

In accordance with the manually adjustable movable base for the outdoor umbrella, the periphery of the lifting block is in insertion fit with the inner end of each pull rod in a one-to-one correspondence manner, a clearance is formed between a fitting portion of the lifting block and each pull rod, so that the lifting block and each pull rod are relatively rotatable; and an outer end of each pull rod is mounted at and fitted with a respective one of the bottom wheels.

In accordance with the manually adjustable movable base for the outdoor umbrella, the periphery of the lifting block is provided with a plurality of inserting blocks, the inner ends of the pull rods are provided with slots, each of the inserting blocks is inserted into a corresponding one of the slots, and an enough clearance is formed between each inserting block and the corresponding one of the corresponding slots.

In accordance with the manually adjustable movable base for the outdoor umbrella, the cranking rod is rotatably fitted with one of the pull rod mounting frames.

In accordance with the manually adjustable movable base for the outdoor umbrella, the cranking rod is in transmission fit with the threaded rod by means of a chain mechanism.

In accordance with the manually adjustable movable base for the outdoor umbrella, an upper end of the cranking rod is provided with a rotating handle.

Compared with the prior art, the manually adjustable movable base for the outdoor umbrella is rational in design and simple in structure, and the automatic telescoping function of the bottom wheels is achieved by means of the structures such as the cranking rod, the threaded rod, the pull rods and the lifting block, so that the base can be in a stable state when not needing to be moved.

DESCRIPTION OF THE EMBODIMENTS

Figure 1:
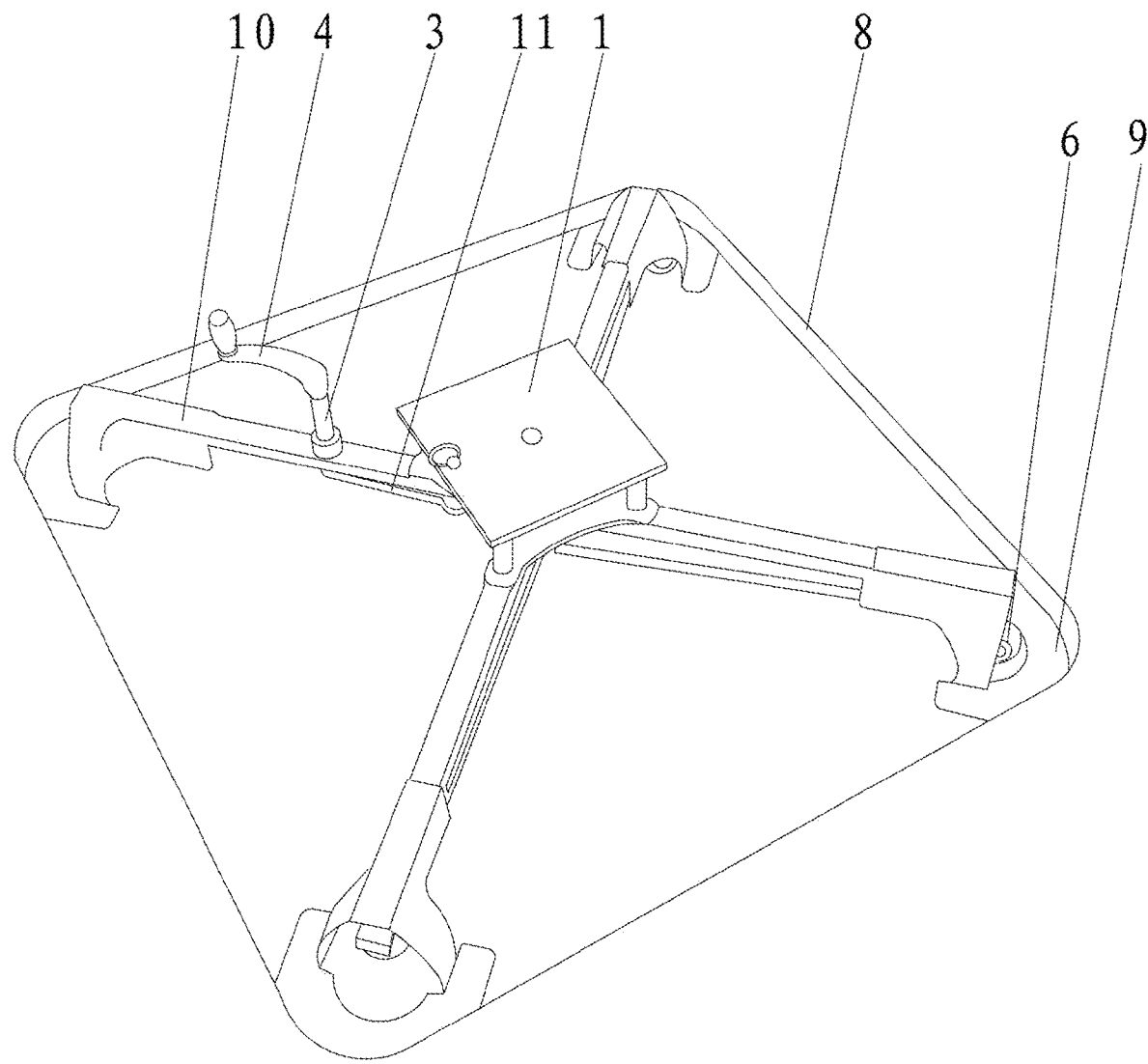
FIG. 1 is a first view of a structure of the present invention.
Figure 2:
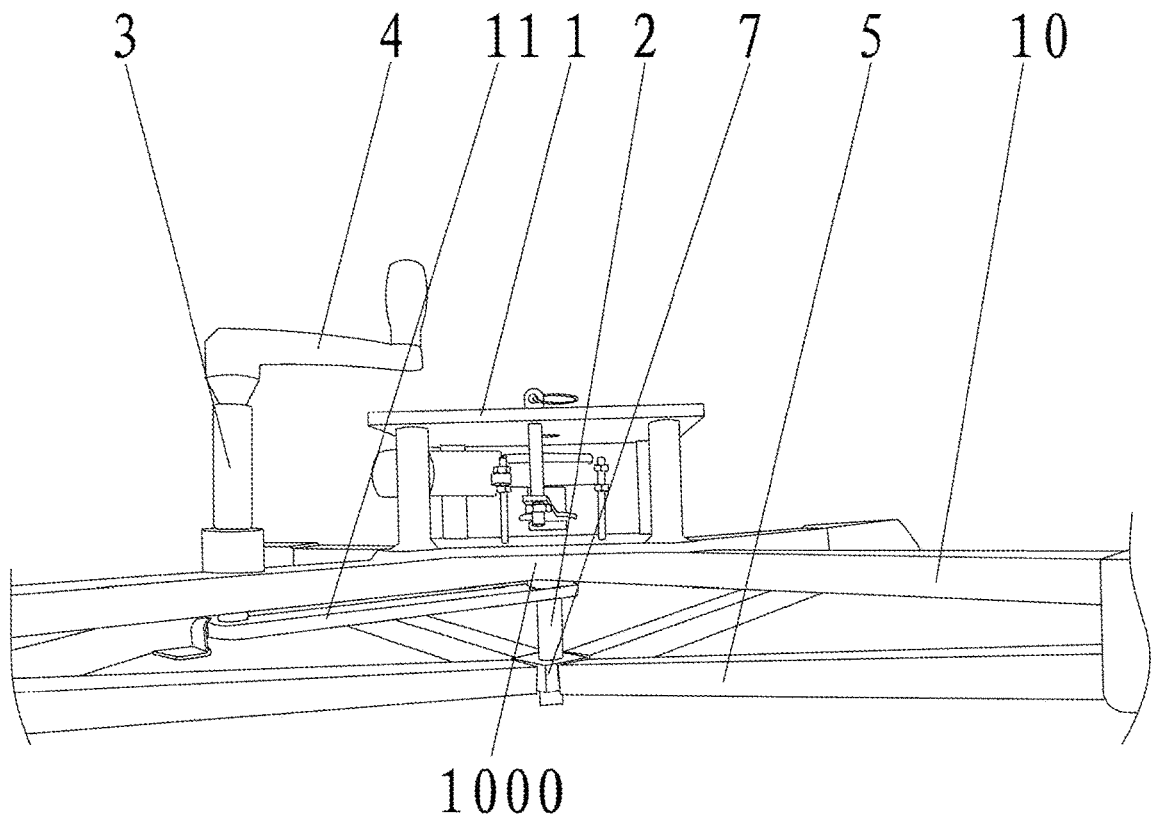
FIG. 2 is a second view of a structure of the present invention.
Figure 3:
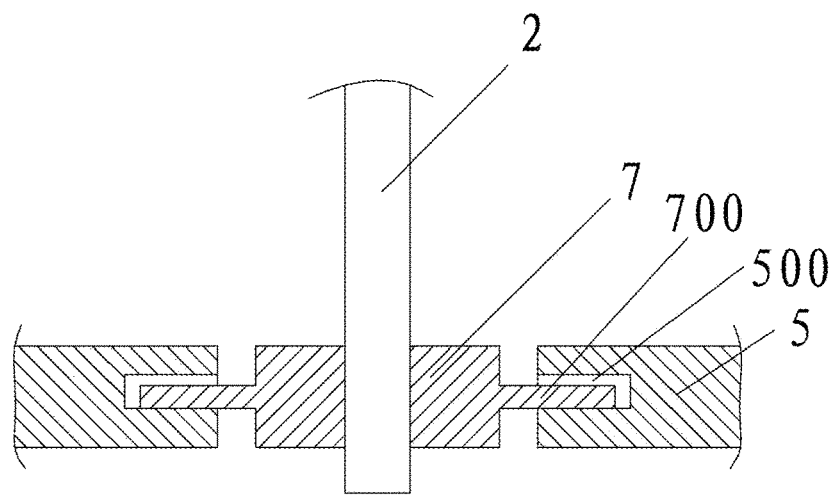
FIG. 3 is a sectional view of a connecting structure of a lifting block and pull rods of the present invention.

The present invention is further described in detail with reference to the accompanying drawings.

As shown in figures, a manually adjustable movable base for an outdoor umbrella includes a base assembly, a threaded rod 2 rotatably fitted with the base assembly, a cranking rod 3 in transmission fit with the threaded rod 2 and used for driving the threaded rod 2 to rotate, a plurality of pull rods 5 rotatably fitted with the base assembly, and a plurality of bottom wheels 6 arranged on the base assembly and in corresponding fit with the pull rods 5. A lower end of the threaded rod 2 is in threaded connection with a lifting block 7, and the lifting block 7 is fitted with and connected to the pull rods 5.

The number of the pull rods 5 and the bottom wheels 6 each are four. The four bottom wheels 6 are respectively located at four corners of the base assembly, and the four pull rods 5 form an X-shaped structure. The outer ends of the pull rods 5 are inclined upwards with respect to the inner ends of the pull rods, and the outer ends of the pull rods 5 are used for mounting the bottom wheels 6 in a well-known way, and the inner ends of the pull rods 5 are in fit with the lifting block 7. Accordingly, the base assembly includes a rectangular base outer frame 8, four bottom wheel enclosure frames 9 respectively and fixedly connected to four corners of the base outer frame 8, and four pull rod mounting frames 10 respectively and fixedly connected to the bottom wheel enclosure frames 9. The inner ends of all the pull rod mounting frames 10 are in fixed fit to form a center portion 1000 for rotatably mounting the threaded rod 2. A mounting base 1 is fixed to and fitted with the center portion 1000, and the mounting base 1 is used for mounting an upright pole of the outdoor umbrella. The inner ends of the pull rod mounting frames 10 are in fixed fit with the mounting base 1. The pull rods 5 are respectively arranged at the lower ends of the pull rod mounting frames 10, the outer ends of the pull rods 5 are rotatably fitted with the pull rod mounting frames 10, and the bottom wheels 6 are respectively located in the bottom wheel enclosure frames 9.

A connecting structure of the lifting block 7 and each pull rod 5 is described as follows. The periphery of the lifting block 7 is in insertion fit with the inner end of each pull rod 5 in a one-to-one correspond ace manner, a clearance is formed between the fitting portion of the lifting block and each pull rod 5, so that the lifting block 7 and the pull rod 5 are relatively rotatable. The outer end of the pull rod 5 is mounted at and fitted with the bottom wheel 6. Specifically, the periphery of the lifting block 7 is provided with four inserting blocks 700, the inner ends of the pull rods 5 are provided with slots 500, each of the inserting blocks 700 is inserted into a corresponding one of the slots 500, and an adequate clearance is provided between each inserting block 700 and the corresponding one of the slots 500.

The cranking rod 3 is rotatably fitted with one of the pull rod mounting frames 10, or can be rotatably mounted at other proper portions. The cranking rod 3 is in transmission fit with the threaded rod 2 by means of a chain mechanism 11, and the chain mechanism 11 is a well-known technology. In addition, the transmission fit of the cranking rod and the threaded rod may be achieved by means of a gear, a belt pulley and other mechanisms. An upper end of the cranking rod 3 is further provided with a rotating handle 4 facilitating the operation of a person.

During operating, the cranking rod 3 is rotated, the cranking rod 3 then drives the threaded rod 2 to rotate by means of the chain mechanism 11, the threaded rod 2 drives the lifting block 7 to move downwards, the lifting block 7 drives the pull rods 5 to rotate in a direction that the outer ends moves upwards and the inner ends moves downwards, the outer ends of the pull rods 5 drive the bottom wheels 6 to respectively retreat into the bottom wheel enclosure frames 9. Therefore, the base can remain stable on the ground and is not easy to slide. Similarly, when the cranking rod 3 is rotated towards an opposite direction, the outer ends of the pull rods 5 drive the bottom wheels 6 to respectively extend out from the bottom wheel enclosure frames 9, and the base can be moved at the moment.

Finally, it should be noted that the above embodiments are only used to illustrate the technical solutions of the present invention rather than limiting the same. Although the present invention has been described in detail with reference to the foregoing embodiments, it should be understood by those of ordinary skill in the art that it is still possible to modify the technical solutions recorded in the foregoing embodiments, or to equivalently replace some or all of technical features, and that these modifications or replacements do not make the essence of the corresponding technical solutions deviate from the scope of the technical solutions of the embodiments of the present invention.

What is claimed is:

1. A manually adjustable movable base for an outdoor umbrella, comprising a base assembly, a threaded rod rotatably fitted with the base assembly, a cranking rod in transmission fit with the threaded rod and configured for driving the threaded rod to rotate, a plurality of pull rods rotatably fitted with the base assembly, and a plurality of bottom wheels arranged on the base assembly and in corresponding fit with the pull rods, wherein a lower end of the threaded rod is in threaded connection with a lifting block, and the lifting block is fitted with and connected to the pull rods, the base assembly comprises a base outer frame, a plurality of bottom wheel enclosure frames respectively and fixedly connected to corners of the base outer frame, and a plurality of pull rod mounting frames respectively and fixedly connected to the bottom wheel enclosure frames; inner ends of all the pull rod mounting frames are in fixed fit to form a center portion configured for rotatably mounting the threaded rod, the center portion is disposed at an end of the threaded rod, and outer ends of the pull rods are rotatably fitted with the pull rod mounting frames; and the bottom wheels are respectively located on the bottom wheel enclosure frames.

2. The manually adjustable movable base for the outdoor umbrella according to claim 1, wherein a number of the pull rods, the bottom wheels, the bottom wheel enclosure frames and the pull rod mounting frames each are four; the four bottom wheels are respectively located at four corners of the base assembly, and the four pull rods and the four pull rod mounting frames form X-shaped structures, respectively.

3. The manually adjustable movable base for the outdoor umbrella according to claim 1, wherein a mounting base is fixed to and fitted with the center portion.

4. The manually adjustable movable base for the outdoor umbrella according to claim 1, wherein a periphery of the lifting block is in insertion fit with an inner end of each pull rod in a one-to-one correspondence manner, and a clearance is formed between a fitting portion of the lifting block and each pull rod, such that the lifting block and each pull rod are relatively rotatable; and the outer end of each pull rod is mounted at and fitted with a respective one of the bottom wheels.

5. The manually adjustable movable base for the outdoor umbrella according to claim 4, wherein the periphery of the lifting block is provided with a plurality of inserting blocks; the inner ends of the pull rods are provided with slots, each of the inserting blocks is inserted into a corresponding one of the slots, and a clearance is provided between each of the inserting blocks and the corresponding one of the slots.

6. The manually adjustable movable base for the outdoor umbrella according to claim 1, wherein each pull rod has the outer end inclined upwards with respect to an inner end thereof.

7. The manually adjustable movable base for the outdoor umbrella according to claim 1, wherein the cranking rod is rotatably fitted with one of the pull rod mounting frames.

8. The manually adjustable movable base for the outdoor umbrella according to claim 1, wherein the cranking rod is in transmission fit with the threaded rod by a chain mechanism.

9. The manually adjustable movable base for the outdoor umbrella according to claim 1, wherein an upper end of the cranking rod is provided with a rotating handle.

* * * * *